US012577381B2

(12) United States Patent
Ito et al.

(10) Patent No.: US 12,577,381 B2
(45) Date of Patent: Mar. 17, 2026

(54) CHLOROPRENE POLYMER COMPOSITION, MANUFACTURING METHOD THEREFOR, AND DIP-MOLDED ARTICLE

(71) Applicant: Denka Company Limited, Tokyo (JP)

(72) Inventors: Misaki Ito, Tokyo (JP); Masao Onozuka, Tokyo (JP); Masahiro Kato, Tokyo (JP)

(73) Assignee: Denka Company Limited, Tokyo (JP)

( * ) Notice: Subject to any disclaimer, the term of this patent is extended or adjusted under 35 U.S.C. 154(b) by 451 days.

(21) Appl. No.: 18/251,300

(22) PCT Filed: Sep. 17, 2021

(86) PCT No.: PCT/JP2021/034390
§ 371 (c)(1),
(2) Date: May 1, 2023

(87) PCT Pub. No.: WO2022/102247
PCT Pub. Date: May 19, 2022

(65) Prior Publication Data
US 2023/0416509 A1    Dec. 28, 2023

(30) Foreign Application Priority Data
Nov. 10, 2020    (JP) ................................. 2020-187108

(51) Int. Cl.
*C08L 11/00*        (2006.01)
*C08F 36/18*        (2006.01)

(52) U.S. Cl.
CPC .............. *C08L 11/00* (2013.01); *C08F 36/18* (2013.01)

(58) Field of Classification Search
CPC ... B29C 41/003; B29C 41/14; B29K 2011/00; B29L 2031/4864; C08F 36/18
See application file for complete search history.

(56) References Cited

U.S. PATENT DOCUMENTS

| | | | |
|---|---|---|---|
| 4,141,875 A | | 2/1979 | Brizzolara et al. |
| 5,298,580 A | * | 3/1994 | Wendling ................ C08F 36/18 |
| | | | 526/216 |
| 2021/0292525 A1 | * | 9/2021 | Onozuka .................... C08J 5/18 |

FOREIGN PATENT DOCUMENTS

| | | | | |
|---|---|---|---|---|
| CN | 110945042 A | | 3/2020 | |
| EP | 3650478 A1 | | 5/2020 | |
| JP | 2008-222736 A | | 9/2008 | |
| JP | 2010-126586 A | | 6/2010 | |
| JP | 5369135 B2 | | 12/2013 | |
| JP | 2014-114342 A | | 6/2014 | |
| JP | 2018083773 A | * | 5/2018 | |
| WO | WO 2017/221881 A1 | | 12/2017 | |
| WO | WO-2019009038 A1 | * | 1/2019 | .............. C08L 11/02 |

OTHER PUBLICATIONS

JP2018083773 English machine translation, prepared Sep. 22, 2025. (Year: 2025).*
The International Bureau of WIPO, International Preliminary Report on Patentability issued in International Application No. PCT/JP2021/034390 (May 25, 2023).
European Patent Office, Extended European Search Report issued in European Patent Application No. 21891495.0 (Mar. 21, 2024).
Japan Patent Office, International Search Report issued in International Application No. PCT/JP2021/034390 (Nov. 2, 2021).

* cited by examiner

*Primary Examiner* — Christopher M Rodd
(74) *Attorney, Agent, or Firm* — Leydig, Voit & Mayer, Ltd.

(57)        ABSTRACT
A method for manufacturing a chloroprene polymer composition, the method including: a polymerization step of polymerizing chloroprene in the presence of at least one rosin acid component selected from the group consisting of a rosin acid and a rosin acid salt to obtain a chloroprene polymer composition containing a chloroprene polymer, in which in the rosin acid component, a mass ratio B1/A1 of a total amount B1 of abietic acid, neoabietic acid, palustric acid, levopimaric acid, and salts thereof with respect to a total amount A1 of dehydroabietic acid, pimaric acid, isopimaric acid, dihydroabietic acid, and salts thereof is 0.10 to 3.00, and a toluene insoluble content of the chloroprene polymer is 50% by mass or more.

18 Claims, No Drawings

CHLOROPRENE POLYMER COMPOSITION, MANUFACTURING METHOD THEREFOR, AND DIP-MOLDED ARTICLE

CROSS-REFERENCE TO RELATED APPLICATIONS

This patent application is the U.S. national phase of International Application No. PCT/JP2021/034390, filed on Sep. 17, 2021, which claims the benefit of Japanese Patent Application No. 2020-187108, filed Nov. 10, 2020, the disclosures of which are incorporated herein by reference in their entireties for all purposes.

TECHNICAL FIELD

The present invention relates to a chloroprene polymer composition, a manufacturing method therefor, a dip-molded article, and the like.

BACKGROUND ART

Chloroprene polymers have been known as materials for dip-molded articles such as surgical gloves for medical purposes, laboratory gloves, industrial gloves, balloons, catheters, and rubber boots. Various techniques concerned with chloroprene polymers for dip-molded articles have been proposed (see, for example, Patent Literature 1 below).

CITATION LIST

Patent Literature

Patent Literature 1: Japanese Unexamined Patent Publication No. 2014-114342

SUMMARY OF INVENTION

Technical Problem

In a dip-molded article (coating film) obtained using a chloroprene polymer composition containing a chloroprene polymer, generally, there is a tendency that flexibility becomes poor when mechanical properties are enhanced, and thus it is required to achieve both of improvement in mechanical properties and impartment of flexibility. In this regard, it is considered to use sulfur (molecular sulfur; for example, cyclic sulfur such as S8) and/or a vulcanization accelerator during vulcanization in order to adjust mechanical properties, but the sulfur and the vulcanization accelerator are causal substances of type IV allergy that cause adverse effects on human bodies (for example, dermatological diseases such as dermatitis), for this reason, reduction or non-use of these components has been studied. Further, cost reduction is also required in the manufacturing of a dip-molded article, and it is required not to use sulfur and a vulcanization accelerator during vulcanization. Therefore, with respect to a chloroprene polymer composition and a manufacturing method therefor, even in a case where sulfur and a vulcanization accelerator are not mixed with respect to a chloroprene polymer composition at the time of producing a dip-molded article, it is required to obtain a dip-molded article having excellent flexibility and mechanical properties, and particularly, it is required to obtain a dip-molded article having excellent flexibility and breaking strength.

An object of an aspect of the present invention is to provide a method for manufacturing a chloroprene polymer composition by which a dip-molded article having excellent flexibility and breaking strength can be obtained even in the case of not using sulfur and a vulcanization accelerator during vulcanization. An object of another aspect of the present invention is to provide a chloroprene polymer composition with which a dip-molded article having excellent flexibility and breaking strength can be obtained even in the case of not using sulfur and a vulcanization accelerator during vulcanization. An object of still another aspect of the present invention is to provide a dip-molded article of the aforementioned chloroprene polymer composition.

Solution to Problem

An aspect of the present invention relates to a method for manufacturing a chloroprene polymer composition, the method including: a polymerization step of polymerizing chloroprene in the presence of at least one rosin acid component selected from the group consisting of a rosin acid and a rosin acid salt to obtain a chloroprene polymer composition containing a chloroprene polymer, in which in the rosin acid component, a mass ratio $B1/A1$ of a total amount $B1$ of abietic acid, neoabietic acid, palustric acid, levopimaric acid, and salts thereof with respect to a total amount $A1$ of dehydroabietic acid, pimaric acid, isopimaric acid, dihydroabietic acid, and salts thereof is 0.10 to 3.00, and a toluene insoluble content of the chloroprene polymer is 50% by mass or more.

Another aspect of the present invention relates to a chloroprene polymer composition containing a chloroprene polymer, in which in the chloroprene polymer, a mass ratio $B2/A2$ of a total amount $B2$ of abietic acid, neoabietic acid, palustric acid, levopimaric acid, and salts thereof with respect to a total amount $A2$ of dehydroabietic acid, pimaric acid, isopimaric acid, dihydroabietic acid, and salts thereof is 0.10 to 3.00, and a toluene insoluble content of the chloroprene polymer is 50% by mass or more.

Still another aspect of the present invention relates to a dip-molded article of the aforementioned chloroprene polymer composition.

Advantageous Effects of Invention

According to an aspect of the present invention, it is possible to provide a method for manufacturing a chloroprene polymer composition by which a dip-molded article having excellent flexibility and breaking strength can be obtained even in the case of not using sulfur and a vulcanization accelerator during vulcanization. According to another aspect of the present invention, it is possible to provide a chloroprene polymer composition with which a dip-molded article having excellent flexibility and breaking strength can be obtained even in the case of not using sulfur and a vulcanization accelerator during vulcanization. According to still another aspect of the present invention, it is possible to provide a dip-molded article of the aforementioned chloroprene polymer composition.

DESCRIPTION OF EMBODIMENTS

Hereinafter, embodiments for carrying out the present invention will be described. Note that, the present invention is not limited to embodiments described below.

"A or more" of the numerical range means A and a range of more than A. "A or less" of the numerical range means A and a range of less than A. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical range may be replaced with the value shown in Examples. "A or B" may include any one of A and B, and may also include both of A and B. Materials listed as examples in the present specification may be used singly or in combinations of two or more kinds thereof, unless otherwise specified. In a case where a plurality of substances corresponding to each component exist in the composition, the content of each component in the composition means the total amount of the plurality of substances that exist in the composition, unless otherwise specified. The term "step" includes not only an independent step but also a step by which an intended action of the step is achieved, though the step cannot be clearly distinguished from other steps. "JIS" means Japanese Industrial Standards.
<Chloroprene Polymer Composition and Manufacturing Method Therefor>

A method for manufacturing a chloroprene polymer composition of the present embodiment includes a polymerization step of polymerizing chloroprene in the presence of at least one rosin acid component selected from the group consisting of a rosin acid and a rosin acid salt to obtain a chloroprene polymer composition containing a chloroprene polymer. In the method for manufacturing a chloroprene polymer composition of the present embodiment, in the rosin acid component, a mass ratio B1/A1 of a total amount B1 of abietic acid, neoabietic acid, palustric acid, levopimaric acid, and salts thereof with respect to a total amount A1 of dehydroabietic acid, pimaric acid, isopimaric acid, dihydroabietic acid, and salts thereof is 0.10 to 3.00, and a toluene insoluble content of the chloroprene polymer obtained in the polymerization step is 50% by mass or more.

A chloroprene polymer composition of the present embodiment contains a chloroprene polymer, in which in the chloroprene polymer, a mass ratio B2/A2 of a total amount B2 of abietic acid, neoabietic acid, palustric acid, levopimaric acid, and salts thereof with respect to a total amount A2 of dehydroabietic acid, pimaric acid, isopimaric acid, dihydroabietic acid, and salts thereof is 0.10 to 3.00, and a toluene insoluble content of the chloroprene polymer is 50% by mass or more. The chloroprene polymer composition of the present embodiment can be obtained by the method for manufacturing a chloroprene polymer composition of the present embodiment. The chloroprene polymer composition of the present embodiment may be a chloroprene polymer latex.

According to the present embodiment, even in the case of not using sulfur and a vulcanization accelerator during vulcanization (in a case where sulfur (vulcanizing agent) and a vulcanization accelerator are not mixed with respect to a chloroprene polymer composition at the time of producing a dip-molded article; the same applies hereinafter), a dip-molded article (for example, a dip-molded film) having excellent flexibility and breaking strength can be obtained.

According to the present embodiment, for example, breaking strength as measured according to JIS K 6251 can be obtained to be 19.0 MPa or more (for example, 20.0 to 30.0 MPa). According to the present embodiment, for example, modulus at 500% elongation as measured according to JIS K 6251 can be obtained to be 0.7 to 2.5 MPa (for example, 0.7 to 2.2 MPa) while obtaining such breaking strength, and can also be obtained to be 1.5 MPa or more (for example, 1.5 to 2.5 MPa). According to the present embodiment, for example, in a case where the chloroprene polymer composition contains a chloroprene polymer, zinc oxide, a butylated reaction product of p-cresol and dicyclopentadiene, and a sodium salt of $\beta$-naphthalene sulfonic acid formalin condensate, a dip-molded article having excellent flexibility and breaking strength can be obtained even in the case of not using sulfur and a vulcanization accelerator during vulcanization. According to the present embodiment, when sulfur and a vulcanization accelerator are not used, it is possible to achieve cost reduction in the manufacturing of a dip-molded article while suppressing use of causal substances of type IV allergy that cause adverse effects on human bodies. The chloroprene polymer composition of the present embodiment is sufficient to enable a dip-molded article having excellent flexibility and breaking strength to be obtained in the case of not using sulfur and a vulcanization accelerator during vulcanization, and sulfur and/or a vulcanization accelerator may be mixed with a chloroprene polymer composition with which such a dip-molded article can be obtained, thus obtaining a dip-molded article.

According to the present embodiment, even in the case of not using sulfur and a vulcanization accelerator during vulcanization, a dip-molded article having excellent flexibility, breaking strength, and breaking elongation can be obtained. According to the present embodiment, even in the case of not using sulfur and a vulcanization accelerator during vulcanization, a dip-molded article excellent in mechanical properties such as breaking strength and breaking elongation while having flexibility can be obtained. According to the present embodiment, for example, breaking elongation as measured according to JIS K 6251 can be obtained to be 800 to 1500%.

In the polymerization step in the method for manufacturing a chloroprene polymer composition of the present embodiment, at least chloroprene (2-chloro-1,3-butadiene) is polymerized in the presence of at least one rosin acid component selected from the group consisting of a rosin acid and a rosin acid salt to obtain a chloroprene polymer composition containing a chloroprene polymer.

The chloroprene polymer has chloroprene as a monomer unit (chloroprene monomer unit; monomer unit=structural unit), and can have a chloroprene-derived monomer unit. Examples of the chloroprene polymer include a homopolymer of chloroprene and a copolymer of chloroprene (a copolymer of chloroprene and a monomer copolymerizable with chloroprene), and a mixture of these polymers may be used. In the polymerization step, chloroprene may be polymerized alone, and chloroprene and the monomer copolymerizable with chloroprene may be copolymerized.

Examples of the monomer copolymerizable with chloroprene include esters of (meth)acrylic acid (such as methyl (meth)acrylate, butyl (meth)acrylate, and 2-ethylhexyl (meth)acrylate), hydroxyalkyl (meth)acrylate (such as 2-hydroxymethyl(meth)acrylate, 2-hydroxyethyl (meth)acrylate, and 2-hydroxypropyl (meth)acrylate), (meth)acrylic acid, 2,3-dichloro-1,3-butadiene, 1-chloro-1,3-butadiene, butadiene, isoprene, ethylene, styrene, and (meth)acrylonitrile. The monomer copolymerizable with chloroprene is not limited to one kind, and, for example, the copolymer of chloroprene may be a copolymer obtained by copolymerizing three or more kinds of monomers containing chloroprene.

The used amount of the chloroprene in the polymerization step may be in the following range on the basis of the total amount of the monomers used in polymerization of the chloroprene polymer or the total amount of the chloroprene and the 2,3-dichloro-1,3-butadiene, from the viewpoint of suitably adjusting a balance between flexibility and mechanical properties (such as breaking strength and breaking elongation) in a dip-molded article. The used amount of the chloroprene in the polymerization step may be 50% by mass or more, 60% by mass or more, 70% by mass or more, 75% by mass or more, 76% by mass or more, more than 76% by mass, 80% by mass or more, 83% by mass or more, 85% by mass or more, 88% by mass or more, 90% by mass or more, 93% by mass or more, more than 93% by mass, or 95% by mass or more. The used amount of the chloroprene in the polymerization step may be 100% by mass or less, less than 100% by mass, 95% by mass or less, 93% by mass or less, less than 93% by mass, 90% by mass or less, 88% by mass or less, 85% by mass or less, 83% by mass or less, 80% by mass or less, 76% by mass or less, less than 76% by mass, 75% by mass or less, or 70% by mass or less. From these viewpoints, the used amount of the chloroprene in the polymerization step may be 50 to 100% by mass, 70 to 95% by mass, or 80 to 90% by mass.

The content of the chloroprene monomer unit in the chloroprene polymer may be in the following range on the basis of the total amount of the monomer units constituting the chloroprene polymer or the total amount of the chloroprene monomer unit and the 2,3-dichloro-1,3-butadiene monomer unit, from the viewpoint of suitably adjusting a balance between flexibility and mechanical properties (such as breaking strength and breaking elongation) in a dip-molded article. The content of the chloroprene monomer unit may be 50% by mass or more, 60% by mass or more, 70% by mass or more, 75% by mass or more, 76% by mass or more, more than 76% by mass, 80% by mass or more, 83% by mass or more, 85% by mass or more, 88% by mass or more, 90% by mass or more, 93% by mass or more, more than 93% by mass, or 95% by mass or more. The content of the chloroprene monomer unit may be 100% by mass or less, less than 100% by mass, 95% by mass or less, 93% by mass or less, less than 93% by mass, 90% by mass or less, 88% by mass or less, 85% by mass or less, 83% by mass or less, 80% by mass or less, 76% by mass or less, less than 76% by mass, 75% by mass or less, or 70% by mass or less. From these viewpoints, the content of the chloroprene monomer unit may be 50 to 100% by mass, 60 to 95% by mass, or 70 to 90% by mass.

In the polymerization step, the chloroprene and the 2,3-dichloro-1,3-butadiene may be polymerized from the viewpoint of suitably adjusting a balance between flexibility and mechanical properties (such as breaking strength and breaking elongation) in a dip-molded article. The used amount of the 2,3-dichloro-1,3-butadiene in the polymerization step may be in the following range on the basis of the total amount of the monomers used in polymerization of the chloroprene polymer or the total amount of the chloroprene and the 2,3-dichloro-1,3-butadiene, from the viewpoint of adjusting a balance between flexibility and mechanical properties (such as breaking strength and breaking elongation) in a dip-molded article. The used amount of the 2,3-dichloro-1,3-butadiene in the polymerization step may be 50% by mass or less, 40% by mass or less, 30% by mass or less, 25% by mass or less, 24% by mass or less, less than 24% by mass, 20% by mass or less, 17% by mass or less, 15% by mass or less, 12% by mass or less, 10% by mass or less, 7% by mass or less, less than 7% by mass, or 5% by mass or less. The used amount of the 2,3-dichloro-1,3-butadiene in the polymerization step may be 0% by mass or more, more than 0% by mass, 5% by mass or more, 7% by mass or more, more than 7% by mass, 10% by mass or more, 12% by mass or more, 15% by mass or more, 17% by mass or more, 20% by mass or more, 24% by mass or more, more than 24% by mass, 25% by mass or more, or 30% by mass or more. From these viewpoints, the used amount of the 2,3-dichloro-1,3-butadiene in the polymerization step may be more than 0% by mass and 50% by mass or less, 5 to 40% by mass, 10 to 30% by mass, or more than 0% by mass and 20% by mass or less.

The chloroprene polymer may have the chloroprene monomer unit and the 2,3-dichloro-1,3-butadiene monomer unit from the viewpoint of suitably adjusting a balance between flexibility and mechanical properties (such as breaking strength and breaking elongation) in a dip-molded article. The content of the 2,3-dichloro-1,3-butadiene monomer unit (the copolymerized amount of the 2,3-dichloro-1, 3-butadiene) in the chloroprene polymer may be in the following range on the basis of the total amount of the monomer units constituting the chloroprene polymer or the total amount of the chloroprene monomer unit and the 2,3-dichloro-1,3-butadiene monomer unit. The content of the 2,3-dichloro-1,3-butadiene monomer unit may be 50% by mass or less, 40% by mass or less, 30% by mass or less, 25% by mass or less, 24% by mass or less, less than 24% by mass, 20% by mass or less, 17% by mass or less, 15% by mass or less, 12% by mass or less, 10% by mass or less, 7% by mass or less, less than 7% by mass, or 5% by mass or less. The content of the 2,3-dichloro-1,3-butadiene monomer unit may be 0% by mass or more, more than 0% by mass, 5% by mass or more, 7% by mass or more, more than 7% by mass, 10% by mass or more, 12% by mass or more, 15% by mass or more, 17% by mass or more, 20% by mass or more, 24% by mass or more, more than 24% by mass, 25% by mass or more, or 30% by mass or more. From these viewpoints, the content of the 2,3-dichloro-1,3-butadiene monomer unit may be more than 0% by mass and 50% by mass or less, 5 to 40% by mass, 10 to 30% by mass, or more than 0% by mass and 20% by mass or less. The content of the 2,3-dichloro-1,3-butadiene monomer unit can be determined by pyrolysis gas chromatography of the chloroprene polymer obtained by freeze-drying the chloroprene polymer composition, and specifically, can be obtained by the method described in Examples.

The chloroprene polymer may not have at least one (meth)acrylic acid selected from the group consisting of acrylic acid and methacrylic acid as a monomer unit. The content of the acrylic acid monomer unit or the methacrylic acid monomer unit may be less than 2.0% by mass, less than 1.0% by mass, 0.5% by mass or less, or 0.1% by mass or less, and may be 0% by mass, on the basis of the total amount of the monomer units constituting the chloroprene polymer. In the polymerization step, the used amount of acrylic acid or the used amount of methacrylic acid may be less than 2.0% by mass, less than 1.0% by mass, 0.5% by mass or less, or 0.1% by mass or less, and may be 0% by mass, on the basis of the total amount of the monomers used in polymerization of the chloroprene polymer.

The chloroprene polymer may be a sulfur-modified chloroprene polymer, a mercaptan-modified chloroprene polymer, a xanthogen-modified chloroprene polymer, a dithiocarbonate-based chloroprene polymer, a trithiocarbonate-based chloroprene polymer, a carbamate-based chloroprene polymer, or the like.

In the polymerization step, chloroprene can be subjected to emulsion polymerization in the presence of a rosin acid component. Examples of the rosin acid salt include alkaline metal salts such as a sodium salt and a potassium salt. The rosin acid component includes at least one selected from the group consisting of a conjugate resin acid component and a non-conjugate resin acid component. Examples of the conjugate resin acid component include abietic acid, neoabietic acid, palustric acid, levopimaric acid, and salts thereof. Examples of the non-conjugate resin acid component include dehydroabietic acid, pimaric acid, isopimaric acid, dihydropimaric acid, dihydroabietic acid, and salts thereof.

In the rosin acid component in the polymerization step, the mass ratio B1/A1 of the total amount B1 of abietic acid, neoabietic acid, palustric acid, levopimaric acid, and salts thereof with respect to the total amount A1 of dehydroabietic acid, pimaric acid, isopimaric acid, dihydroabietic acid, and salts thereof is 0.10 to 3.00, from the viewpoint of obtaining a dip-molded article having excellent flexibility and breaking strength.

The mass ratio B1/A1 may be 0.20 or more, 0.30 or more, 0.40 or more, 0.50 or more, 0.60 or more, 0.70 or more, 0.80 or more, 1.00 or more, 1.20 or more, 1.50 or more, 1.80 or more, 2.00 or more, or 2.20 or more, from the viewpoint of suitably adjusting a balance between flexibility and mechanical properties (such as breaking strength and breaking elongation) in a dip-molded article. The mass ratio B1/A1 may be 5.00 or less, 4.00 or less, 3.00 or less, 2.50 or less, 2.20 or less, 2.00 or less, 1.80 or less, 1.50 or less, 1.20 or less, 1.00 or less, 0.80 or less, 0.70 or less, 0.60 or less, 0.50 or less, or 0.40 or less, from the viewpoint of suitably adjusting a balance between flexibility and mechanical properties (such as breaking strength and breaking elongation) in a dip-molded article. From these viewpoints, the mass ratio B1/A1 may be 0.30 to 2.50, 0.10 to 2.00, 0.50 to 2.00, or 0.60 to 1.20. The mass ratio B1/A1 is a mass ratio in the entire rosin acid component, and in the case of using a plurality of rosin acid components in the polymerization step, the mass ratio B1/A1 is an average value of the mass ratios B1/A1 as calculated on the basis of the mass ratios B1/A1 of respective rosin acid components and the used amounts of the rosin acid components.

The mass ratio B1/A1 can be obtained in such a manner that gas chromatography is performed using a solution (rosin acid component: 1.5% by mass) obtained by dissolving the rosin acid component in an ethanol/toluene azeotropic mixture (ETA solution) defined in JIS K 6229 and then performing a hydrochloric acid treatment, and an area percentage of the peak area of each component with respect to the total peak area value is regarded as the content of each component. Specifically, the mass ratio B1/A1 can be obtained by the method described in Examples.

The rosin acid component in the polymerization step may include a rosin acid component in which a mass ratio b1/a1 of a total amount b of abietic acid, neoabietic acid, palustric acid, levopimaric acid, and salts thereof with respect to a total amount a1 of dehydroabietic acid, pimaric acid, isopimaric acid, dihydroabietic acid, and salts thereof is 0.10 to 3.00, may include a rosin acid component having a mass ratio b1/a1 of 0.10 to 2.00, and may include a rosin acid component having a mass ratio b1/a1 of 0.60 to 1.20. The content of the rosin acid components having these mass ratios b1/a1 may be 50% by mass or more, 60% by mass or more, 70% by mass or more, 73% by mass or more, 75% by mass or more, 80% by mass or more, 85% by mass or more, 90% by mass or more, 95% by mass or more, or 98% by mass or more, on the basis of the total amount of the rosin acid components in the polymerization step (the total amount of the rosin acid components used in the polymerization step), from the viewpoint of suitably adjusting a balance between flexibility and mechanical properties (such as breaking strength and breaking elongation) in a dip-molded article. The rosin acid component in the polymerization step (the rosin acid component used in the polymerization step) may be an embodiment composed of a rosin acid component having a mass ratio b1/a1 of 0.10 to 3.00, a rosin acid component having a mass ratio b1/a1 of 0.10 to 2.00, or a rosin acid component having a mass ratio b1/a1 of 0.60 to 1.20 (an embodiment in which 100% by mass of the rosin acid component used in the polymerization step is any one of these rosin acid components).

The used amount of the rosin acid component (the total amount of the rosin acid components) in the polymerization step may be in the following range with respect to 100 parts by mass of the monomers used in polymerization of the chloroprene polymer. The used amount of the rosin acid component may be 1.0 part by mass or more, 2.0 parts by mass or more, 3.0 parts by mass or more, 3.3 parts by mass or more, 3.5 parts by mass or more, 4.0 parts by mass or more, 4.5 parts by mass or more, 4.6 parts by mass or more, 4.8 parts by mass or more, 5.0 parts by mass or more, or 5.3 parts by mass or more, from the viewpoint of easily obtaining particularly excellent mechanical properties (such as breaking strength and breaking elongation) in a dip-molded article. The used amount of the rosin acid component may be 10 parts by mass or less, 8.0 parts by mass or less, 6.0 parts by mass or less, 5.5 parts by mass or less, 5.3 parts by mass or less, 5.0 parts by mass or less, or 4.8 parts by mass or less, from the viewpoint of easily obtaining particularly excellent flexibility in a dip-molded article. From these viewpoints, the used amount of the rosin acid component may be 1.0 to 10 parts by mass, 3.0 to 5.0 parts by mass, or 4.0 to 5.0 parts by mass. The used amount of the rosin acid component may be 4.6 parts by mass or less, 4.5 parts by mass or less, 4.0 parts by mass or less, 3.5 parts by mass or less, or 3.3 parts by mass or less, from the viewpoint of adjusting a balance between flexibility and mechanical properties (such as breaking strength and breaking elongation) in a dip-molded article.

In the polymerization step, an emulsifier (excluding a rosin acid component) and/or fatty acids may be used. Examples of the emulsifier include a metal salt of aromatic sulfonic acid formalin condensate, sodium dodecylbenzenesulfonate, potassium dodecylbenzenesulfonate, sodium alkyldiphenyl ether sulfonate, potassium alkyldiphenyl ether sulfonate, sodium polyoxyethylene alkyl ether sulfonate, sodium polyoxypropylene alkyl ether sulfonate, potassium polyoxyethylene alkyl ether sulfonate, and potassium polyoxypropylene alkyl ether sulfonate. Examples of the fatty acids include fatty acids (for example, saturated or unsaturated fatty acids having 6 to 22 carbon atoms) and metal salts of fatty acids (for example, sodium laurylsulfate).

As the emulsifier (excluding a rosin acid component) and/or the fatty acids, an anionic surfactant can be used. The content of the anionic surfactant in the chloroprene polymer composition may be 0.2 to 1.0 part by mass with respect to 100 parts by mass of the chloroprene polymer. The used amount of the anionic surfactant in the polymerization step may be 0.2 to 0.9 parts by mass with respect to 100 parts by mass of the monomers used in polymerization of the chloroprene polymer or 100 parts by mass of the total of the chloroprene and the 2,3-dichloro-1,3-butadiene.

In the polymerization step, chloroprene may be subjected to polymerization (for example, emulsion polymerization) in the presence of a chain transfer agent. The chain transfer agent is not particularly limited, and a known chain transfer agent that is generally used in emulsion polymerization of chloroprene can be used. Examples of the chain transfer agent include alkylmercaptans (for example, long chain alkylmercaptans) such as dodecylmercaptan (such as n-dodecylmercaptan and tert-dodecylmercaptan); dialkylxanthogen disulfides such as diisopropylxanthogen disulfide and diethylxanthogen disulfide; and iodoform.

The used amount of the chain transfer agent before polymerization (for example, emulsion polymerization) initiation may be in the following range, with respect to 100 parts by mass of the monomers used in polymerization of the chloroprene polymer or 100 parts by mass of the total of the chloroprene and the 2,3-dichloro-1,3-butadiene. The used amount of the chain transfer agent may be 0.001 parts by mass or more, 0.005 parts by mass or more, 0.008 parts by mass or more, 0.01 parts by mass or more, 0.02 parts by mass or more, or 0.03 parts by mass or more, from the viewpoint of easily improving the storage stability of the chloroprene polymer composition. The used amount of the chain transfer agent may be 1 part by mass or less, 0.5 parts by mass or less, 0.1 parts by mass or less, 0.05 parts by mass or less, 0.04 parts by mass or less, or 0.03 parts by mass or less, from the viewpoint of easily obtaining excellent mechanical properties of a dip-molded article. From these viewpoints, the used amount of the chain transfer agent may be 0.001 to 1 part by mass, 0.01 to 0.1 parts by mass, or 0.02 to 0.05 parts by mass.

The pH of an aqueous emulsion at the time of emulsion polymerization initiation may be 10.5 to 13.5. The aqueous emulsion refers to a liquid mixture of chloroprene, 2,3-dichloro-1,3-butadiene, alkyl mercaptan, and the like immediately before emulsion polymerization initiation, but also encompasses a case where the composition thereof varies by adding respective components afterward, portionwise, etc. When the pH of the aqueous emulsion at the time of emulsion polymerization initiation is 10.5 or more, the polymerization reaction is likely to be stably controlled. When the pH is 13.5 or less, an excessive increase in viscosity during polymerization is suppressed, and the polymerization reaction is likely to be stably controlled.

As a polymerization initiator to be added to the aqueous emulsion at the time of emulsion polymerization initiation, a polymerization initiator used in common radical polymerization can be used, and examples thereof include potassium persulfate, benzoyl peroxide, ammonium persulfate, and hydrogen peroxide.

The polymerization temperature of polymerization (for example, emulsion polymerization) may be in the following range. The polymerization temperature may be 5° C. or higher, 10° C. or higher, 15° C. or higher, 20° C. or higher, 25° C. or higher, higher than 25° C., 30° C. or higher, 35° C. or higher, 40° C. or higher, or 45° C. or higher, from the viewpoint of suitably adjusting a balance between flexibility and mechanical properties (such as breaking strength and breaking elongation) in a dip-molded article. The polymerization temperature may be 50° C. or lower, 45° C. or lower, 40° C. or lower, 35° C. or lower, 30° C. or lower, 25° C. or lower, lower than 25° C., 20° C. or lower, or 15° C. or lower, from the viewpoint of suitably adjusting a balance between flexibility and mechanical properties (such as breaking strength and breaking elongation) in a dip-molded article. From these viewpoints, the polymerization temperature may be 5 to 50° C., 10 to 45° C., or 15 to 35° C.

The polymerization reaction can be terminated by adding a polymerization inhibitor. Examples of the polymerization inhibitor include thiodiphenylamine, 4-tert-butylcatechol, and 2,2'-methylenebis-4-methyl-6-tert-butylphenol. The unreacted monomer after the completion of polymerization can be removed by a common method such as distillation under a reduced pressure.

The polymerization conversion rate of the polymerization reaction may be in the following range. The polymerization conversion rate may be 50% or more, 55% or more, 60% or more, 62% or more, 65% or more, 70% or more, 75% or more, 80% or more, more than 80%, 83% or more, or 85% or more, from the viewpoint of suitably adjusting a balance between flexibility and mechanical properties (such as breaking strength and breaking elongation) in a dip-molded article and the viewpoint of excellent production cost. The polymerization conversion rate may be 95% or less, 90% or less, 85% or less, 83% or less, 80% or less, less than 80%, 75% or less, 70% or less, 65% or less, 62% or less, 60% or less, or 55% or less, from the viewpoint of suitably adjusting a balance between flexibility and mechanical properties (such as breaking strength and breaking elongation) in a dip-molded article and the viewpoint of easily avoiding a decrease in polymerization reactivity due to a decrease in unreacted monomers and easily improving productivity. From these viewpoints, the polymerization conversion rate may be 50 to 95%, 60 to 90%, or 70 to 85%.

In the method for manufacturing a chloroprene polymer composition of the present embodiment, various additives can be optionally added after the polymerization step. The chloroprene polymer composition of the present embodiment may contain residues of the components having been used at the time of synthesis of the chloroprene polymer, and may contain the additive having been added after the polymerization step. Examples of the additive include an emulsifier (such as a sodium salt of β-naphthalene sulfonic acid formalin condensate), a polymerization inhibitor (such as a butylated reaction product of p-cresol and dicyclopentadiene), a freezing stabilizer, an emulsion stabilizer, a viscosity modifier, an antioxidant, and a preservative. The content of potassium ions in the chloroprene polymer composition of the present embodiment may be 1 part by mass or less, less than 0.5 parts by mass, or 0.1 parts by mass or less, with respect to 100 parts by mass of the chloroprene polymer.

In the chloroprene polymer composition of the present embodiment, the mass ratio B2/A2 of the total amount B2 of abietic acid, neoabietic acid, palustric acid, levopimaric acid, and salts thereof with respect to the total amount A2 of dehydroabietic acid, pimaric acid, isopimaric acid, dihydroabietic acid, and salts thereof is 0.10 to 3.00, from the viewpoint of obtaining a dip-molded article having excellent flexibility and breaking strength.

The mass ratio B2/A2 may be 0.20 or more, 0.30 or more, 0.40 or more, 0.50 or more, 0.60 or more, 0.70 or more, 0.80 or more, 1.00 or more, 1.20 or more, 1.50 or more, 1.80 or more, 2.00 or more, or 2.20 or more, from the viewpoint of suitably adjusting a balance between flexibility and mechanical properties (such as breaking strength and breaking elongation) in a dip-molded article. The mass ratio B2/A2 may be 5.00 or less, 4.00 or less, 3.00 or less, 2.50 or less, 2.20 or less, 2.00 or less, 1.80 or less, 1.50 or less, 1.20 or less, 1.00 or less, 0.80 or less, 0.70 or less, 0.60 or less, 0.50 or less, or 0.40 or less, from the viewpoint of suitably adjusting a balance between flexibility and mechanical properties (such as breaking strength and breaking elongation) in a dip-molded article. From these viewpoints, the mass ratio B2/A2 may be 0.30 to 2.50, 0.10 to 2.00, 0.50 to 2.00, or 0.60 to 1.20.

The mass ratio B2/A2 can be obtained in such a manner that gas chromatography is performed using an extract obtained by extraction with an ethanol/toluene azeotropic mixture (ETA solution) defined in JIS K 6229 from a chloroprene polymer obtained by freeze-drying the chloroprene polymer composition and then performing a hydrochloric acid treatment, and an area percentage of the peak area of each component with respect to the total peak area value is regarded as the content of each component. Specifically, the mass ratio B2/A2 can be obtained by the method described in Examples.

The toluene insoluble content of the chloroprene polymer is 50% by mass or more on the basis of the entire chloroprene polymer, from the viewpoint of obtaining an excellent breaking strength of a dip-molded article. When the toluene insoluble content is 50% by mass or more, it is speculated that entanglement or the like (gelation) of polymers forms a cross-linked structure so that an excellent breaking strength is obtainable. However, the factor for obtaining the effect is not limited to these contents.

The toluene insoluble content of the chloroprene polymer may be 55% by mass or more, 60% by mass or more, 65% by mass or more, 70% by mass or more, 75% by mass or more, 80% by mass or more, 85% by mass or more, or 89% by mass or more, for suitably adjusting a balance between flexibility and mechanical properties (such as breaking strength and breaking elongation) in a dip-molded article. The toluene insoluble content of the chloroprene polymer is 100% by mass or less, and may be 95% by mass or less, 90% by mass or less, 89% by mass or less, 85% by mass or less, 80% by mass or less, 75% by mass or less, 70% by mass or less, 65% by mass or less, or 60% by mass or less, from the viewpoint of suitably adjusting a balance between flexibility and mechanical properties (such as breaking strength and breaking elongation) in a dip-molded article. From these viewpoints, the toluene insoluble content of the chloroprene polymer is 50 to 100% by mass, and may be 60 to 95% by mass, or 70 to 90% by mass. The toluene insoluble content of the chloroprene polymer can be adjusted by the type or used amount of the chain transfer agent used at the time of polymerization of the chloroprene polymer, the polymerization conversion rate at the time of polymerization of the chloroprene polymer, and the like.

The toluene insoluble content of the chloroprene polymer can be determined in such a manner that a chloroprene polymer obtained by freeze-drying the chloroprene polymer composition is dissolved in toluene and subjected to centrifugal separation, and then the mass of the dried product obtained by drying the insoluble content separated using a 200-mesh wire net is measured. Specifically, the toluene insoluble content of the chloroprene polymer can be obtained by the method described in Examples.

<Vulcanizate, Dip-Molded Article, Manufacturing Method for These>

A vulcanizate may be obtained by vulcanizing the chloroprene polymer composition of the present embodiment. A vulcanizate of the present embodiment is a vulcanizate of the chloroprene polymer composition of the present embodiment and is obtained by vulcanizing the chloroprene polymer composition of the present embodiment. A method for manufacturing a vulcanizate of the present embodiment includes a step of vulcanizing the chloroprene polymer composition of the present embodiment to obtain a vulcanizate. The vulcanizate of the present embodiment may have a film shape.

A dip-molded article of the present embodiment is a dip-molded article of the chloroprene polymer composition of the present embodiment. The dip-molded article of the present embodiment is a dip-molded article using the chloroprene polymer composition of the present embodiment and is obtained by dip-molding the chloroprene polymer composition of the present embodiment. A method for manufacturing a dip-molded article of the present embodiment includes a step of dip-molding the chloroprene polymer composition of the present embodiment. Examples of a molding method when the dip-molded article of the present embodiment is manufactured include a congealing liquid dipping method, but the molding method is not limited thereto, and the dip-molded article may be molded according to a common method. The dip-molded article of the present embodiment may be a dip-molded film formed on a base material. The dip-molded article of the present embodiment has a low modulus and is soft, and is excellent in mechanical properties such as breaking strength and breaking elongation. The dip-molded article of the present embodiment may be a molded article of the vulcanizate of the present embodiment. The dip-molded article of the present embodiment may be gloves, balloons, catheters, or boots. The thickness (for example, the minimum thickness) of the dip-molded article may be 0.01 to 0.5 mm, 0.1 to 0.5 mm, 0.1 to 0.3 mm, or 0.1 to 0.2 mm.

The dip-molded article of the present embodiment may contain a vulcanizing agent and/or a vulcanization accelerator, or may not contain a vulcanizing agent and/or a vulcanization accelerator. Whether or not a vulcanizing agent and/or a vulcanization accelerator is blended may be determined depending on an intended dip-molded article. The dip-molded article of the present embodiment exhibits excellent flexibility and mechanical properties (such as breaking strength and breaking elongation) regardless of the presence or absence of a vulcanizing agent and/or a vulcanization accelerator, but from the viewpoint of allergy reduction and cost reduction, the dip-molded article may not contain sulfur (molecular sulfur; for example, cyclic sulfur such as S8) and a vulcanization accelerator.

Examples of the vulcanizing agent include sulfur (molecular sulfur; for example, cyclic sulfur such as S8), zinc oxide, and magnesium oxide.

The vulcanization accelerator is a component that interacts with a vulcanizing agent to increase a vulcanization rate and is added for the purpose of shortening a vulcanization time, lowering a vulcanization temperature, decreasing the amount of a vulcanizing agent, improving physical properties of a vulcanized rubber, and the like at the time of vulcanization of a raw material rubber, and typically refers to a component accelerating a sulfur vulcanization reaction.

Examples of the vulcanization accelerator include thiuram-based, dithiocarbamate-based, thiourea-based, guanidine-based, xanthate-based, and thiazole-based vulcanization accelerators. The dip-molded article of the present embodiment may not contain at least one of thiuram-based, dithiocarbamate-based, thiourea-based, guanidine-based, xanthate-based, and thiazole-based vulcanization accelerators.

Examples of the thiuram-based vulcanization accelerator include tetramethylthiuram disulfide, tetraethylthiuram disulfide, tetrabutylthiuram disulfide, tetrakis(2-ethylhexyl)thiuram disulfide, tetramethylthiuram monosulfide, and dipentamethylenethiuram tetrasulfide.

Examples of dithiocarbamate-based vulcanization accelerator include zinc dibutyldithiocarbamate, sodium dibutyldithiocarbamate, zinc dimethyldithiocarbamate, zinc diethyldithiocarbamate, zinc N-ethyl-N-phenyldithiocarbamate, zinc N-pentamethylenedithiocarbamate, copper dimethyldithiocarbamate, ferric dimethyldithiocarbamate, and tellurium diethyldithiocarbamate.

Examples of the thiourea-based vulcanization accelerator include ethylene thiourea, N,N'-diethylthiourea, trimethylthiourea, and N,N'-diphenylthiourea.

Examples of the guanidine-based vulcanization accelerator include 1,3-diphenylguanidine, 1,3-di-o-tolylguanidine, 1-o-tolylbiguanide, and dicatechol borate di-o-tolylguanidine salt.

Examples of the xanthate-based vulcanization accelerator include zinc butylxanthate and zinc isopropylxanthate.

Examples of the thiazole-based vulcanization accelerator include 2-mercaptobenzothiazole, di-2-benzothiazolyl disulfide, 2-mercaptobenzothiazole zinc salt, 2-mercaptobenzothiazole cyclohexylamine salt, and 2-(4'-morpholinodithio)benzothiazole.

EXAMPLES

Hereinafter, the present invention will be more specifically described on the basis of Examples and Comparative Examples; however, the present invention is not limited to these Examples.

<Production of Chloroprene Polymer Latex>

To a polymerization tank having an inner volume of 40 L, 85 parts by mass of chloroprene (monomer), 15 parts by mass of 2,3-dichloro-1,3-butadiene (monomer), 0.03 parts by mass of n-dodecylmercaptan, 90 parts by mass of pure water, 4.8 parts by mass of rosin acid A (product prepared by Denka Company Limited), 1.50 parts by mass of potassium hydroxide, and 0.40 parts by mass of a sodium salt of β-naphthalene sulfonic acid formalin condensate (trade name "DEMOL N", manufactured by Kao Corporation) were added. The pH of the aqueous emulsion before polymerization initiation was 12.9. 0.1 parts by mass of potassium persulfate was added as a polymerization initiator, and polymerization was performed under a nitrogen flow at a polymerization temperature of 20° C. 0.01 parts by mass of diethylhydroxyamine as a polymerization inhibitor was added at the time point of a polymerization conversion rate of 83% to terminate the polymerization, thereby obtaining a latex before distillation. This latex before distillation was subjected to distillation under a reduced pressure to remove unreacted monomers, thereby obtaining a post-distillation latex A (solid content: 55% by mass) containing a mercaptan-modified chloroprene polymer.

Latexes B to O (solid content: 55% by mass) were obtained in the same manner as in the latex A, except that components and conditions shown in Table 1 or Table 2 were used (rosin acids B and C: product prepared by Denka Company Limited, disproportionated potassium rosinate X: trade name "RONDIS K-25", manufactured by ARAKAWA CHEMICAL INDUSTRIES, LTD.). Note that, in the latex O, since radicals serving as activated species of polymerization were trapped by the conjugate resin acid so that inhibition of polymerization occurred, the chloroprene polymer could not be polymerized, and thus the following evaluation was not performed.

<Mass Ratio of Conjugate Resin Acid Component/Non-Conjugate Resin Acid Component in Rosin Acid Component>

The mass ratio of the conjugate resin acid component/the non-conjugate resin acid component in the aforementioned rosin acids A to C was measured. First, a rosin acid was dissolved in an ethanol/toluene azeotropic mixture (ETA solution) defined in JIS K 6229 and then subjected to a hydrochloric acid treatment, thereby obtaining a solution (rosin acid: 1.5% by mass). Gas chromatography was performed under the following conditions using this solution.

[Conditions of Gas Chromatography]

Gas chromatograph mass spectrometer: trade name "JEOL Jms-Q1050GC", manufactured by JEOL Ltd.

Used column: FFAP 0.32 mmφ×25 m (film thickness: 0.3 μm)

Column temperature: 200° C.→250° C.

Temperature increase rate: 10° C./min

Injection port temperature: 270° C.

Injection amount: 1 μL

Interface temperature: 270° C.

Ion source temperature: 270° C.

Ionization current: 50 pA

Ionization voltage: 70 eV

Detector: FID

Detector voltage: −1000 V

Detector voltage: EI method

Detector temperature: 270° C.

From the measurement result of the gas chromatography, the peak area of the conjugate resin acid component of each of an abietic acid component (abietic acid and a salt thereof: this is also the same for other conjugate resin acids), a neoabietic acid component, a palustric acid component, and a levopimaric acid component was determined, and the peak area of the non-conjugate resin acid component of each of a dehydroabietic acid component, a pimaric acid component, an isopimaric acid component, and a dihydroabietic acid component was determined. The area percentage of the peak area of each component with respect to the total peak area was regarded as the content of each component, and the contents of the conjugate resin acid component and the non-conjugate resin acid component were measured.

In the rosin acid A, the area percentage of the conjugate resin acid component was 31.2% for the abietic acid component, 0.8% for the neoabietic acid component, 4.0% for the palustric acid component, and 2.7% for the levopimaric acid component, and the total area of the conjugate resin acid components was 38.7%. The area percentage of the non-conjugate resin acid component was 35.3% for the dehydroabietic acid component, 7.5% for the pimaric acid component, 3.2% for the isopimaric acid component, and 2.4% for the dihydroabietic acid component, and the total area of the non-conjugate resin acid components was 48.4%. From the above, the mass ratio $b1/a1$ of the conjugate resin acid component/the non-conjugate resin acid component was calculated to be "38.7/48.4=0.80".

The mass ratio $b1/a1$ of the conjugate resin acid component/the non-conjugate resin acid component was 2.20 in the rosin acid B and 3.20 in the rosin acid C. When gas chromatography of the aforementioned potassium rosinate X was performed in the same manner, none of the abietic acid component, the neoabietic acid component, the palustric acid component, and the levopimaric acid component was detected, and the mass ratio $b1/a1$ of the conjugate resin acid component/the non-conjugate resin acid component was 0.

Furthermore, the mass ratio $B1/A1$ of the conjugate resin acid component/the non-conjugate resin acid component of the entire rosin acid component used in polymerization was calculated on the basis of the mass ratio $b1/a1$ and the used amount of each rosin acid component. Results are presented in Table 1 and Table 2.

<Mass Ratio of Conjugate Resin Acid Component/Non-Conjugate Resin Acid Component in Chloroprene Polymer>

3 g of the solid content of the chloroprene polymer obtained by freeze-drying the aforementioned chloroprene polymer latex was cut into 2 mm square to obtain a test piece. This test piece was placed in an eggplant-shaped flask equipped with condenser, gas chromatography was then performed using an extract obtained by extraction with an ethanol/toluene azeotropic mixture (ETA solution) defined in JIS K 6229 and then performing a hydrochloric acid treatment under the same aforementioned conditions as those of analysis of the mass ratio of the conjugate resin acid component/the non-conjugate resin acid component in the rosin acid component, and the mass ratio B2/A2 of the conjugate resin acid component/the non-conjugate resin acid component in the chloroprene polymer was calculated. Results are presented in Table 1 and Table 2.

<2,3-Dichloro-1,3-Butadiene Copolymerized Amount>

The solid content of the chloroprene polymer obtained by freeze-drying the aforementioned chloroprene polymer latex was cut to obtain 0.05 mg of a test piece. By performing pyrolysis gas chromatography using this test piece under the following conditions, the 2,3-dichloro-1,3-butadiene copolymerized amount in the chloroprene polymer (basis: the total amount of the monomer units constituting the chloroprene polymer=the total amount of the chloroprene monomer unit and the 2,3-dichloro-1,3-butadiene monomer unit) was calculated. Results are presented in Table 1 and Table 2.

[Conditions of Pyrolysis Gas Chromatography]

Pyrolysis gas chromatography apparatus: trade name "Agilent 5890", manufactured by Agilent Technologies, Inc.

Used column: DB-5 0.25 mmφ×30 m (film thickness: 1.0 μm)

Column temperature: 50° C.→10° C./min 120° C.→25° C./min→+300° C.

Injection port temperature: 270° C.

Sample amount: 0.05 mg

Detector: FID

Detector temperature: 280° C.

<Toluene Insoluble Content>

1 g of the chloroprene polymer obtained by freeze-drying the aforementioned chloroprene polymer latex was cut into 2 mm square to obtain a test piece. This test piece was placed in a conical beaker, and then the test piece was dissolved in toluene over 16 hours. Subsequently, centrifugal separation was performed, and then gel fractions (insoluble contents) were separated using a 200-mesh wire net. Thereafter, by drying the gel fractions and then measuring the mass of the dried product, the toluene insoluble content in the chloroprene polymer was calculated. Results are presented in Table 1 and Table 2.

Production of Evaluation Sample

Examples 1 to 11 and Comparative Examples 1 to 3

An aqueous dispersion A was prepared by mixing 2 parts by mass of zinc oxide (trade name "Zinc oxide II", manufactured by SAKAI CHEMICAL INDUSTRY CO., LTD.), 2 parts by mass of a butylated reaction product of p-cresol and dicyclopentadiene (trade name "NOCRAC PBK", manufactured by OUCHI SHINKO CHEMICAL INDUSTRIAL CO., LTD.), 0.1 parts by mass of a sodium salt of s-naphthalene sulfonic acid formalin condensate (trade name "DEMOL N", manufactured by Kao Corporation), and 14 parts by mass of water at 20° C. for 16 hours using a ceramic ball mill.

7.1 parts by mass of this aqueous dispersion A was mixed with 100 parts by mass of solid contents of the latex (chloroprene polymer latex) shown in Table 1 or Table 2, and then water was added to adjust the solid content concentration to 30% by mass, thereby obtaining a latex composition I not containing sulfur (vulcanizing agent) and a vulcanization accelerator.

A congealing liquid was obtained by mixing 62 parts by mass of water, 35 parts by mass of potassium nitrate tetrahydrate, and 3 parts by mass of calcium carbonate. A ceramic cylinder (manufactured by SHINKO IND. LTD.) having an outside diameter of 50 mm was immersed in this congealing liquid (23° C.) for 1 second and then taken out. After the cylinder was dried for 3 minutes, the cylinder was immersed in the aforementioned latex composition I for 10 seconds 23° C. Subsequently, the cylinder was washed with running water set at 45° C. for 1 minute, and then vulcanized at 100° C. for 30 minutes, thereby producing a film for evaluation on the outer periphery or the like of the cylinder. The film for evaluation was peeled off from the outer periphery of the cylinder and then the following evaluation was performed.

Example 12

An aqueous dispersion B was obtained in the same manner as in the aqueous dispersion A, except that 1 part by mass of sulfur (S8: vulcanizing agent) was further used and the used amount of water was changed to 13 parts by mass. 7.1 parts by mass of this aqueous dispersion B was mixed with 100 parts by mass of solid contents of the aforementioned latex A, and then water was added to adjust the solid content concentration to 30% by mass, thereby obtaining a latex composition II containing sulfur (vulcanizing agent) but not containing a vulcanization accelerator. A film for evaluation was produced in the same manner as in the latex composition I, except that the latex composition H was used instead of the aforementioned latex composition I.

Example 13

An aqueous dispersion C was obtained in the same manner as in the aqueous dispersion A, except that 1 part by mass of sulfur (S8; vulcanizing agent) and 2 parts by mass of a vulcanization accelerator (zinc di-n-butyl-dithiocarbamate, trade name "NOCCELER BZ", manufactured by OUCHI SHINKO CHEMICAL INDUSTRIAL CO., LTD.) were further used and the used amount of water was changed to 11 parts by mass. 7.1 parts by mass of this aqueous dispersion C was mixed with 100 parts by mass of solid contents of the aforementioned latex A, and then water was added to adjust the solid content concentration to 30% by mass, thereby obtaining a latex composition III containing sulfur (vulcanizing agent) and a vulcanization accelerator. A film for evaluation was produced in the same manner as in the latex composition I, except that the latex composition III was used instead of the aforementioned latex composition I.

Reference Example 1

7.1 parts by mass of the aforementioned aqueous dispersion C was mixed with 100 parts by mass of solid contents of the aforementioned latex L, and then water was added to adjust the solid content concentration to 30% by mass, thereby obtaining a latex composition IV containing sulfur (vulcanizing agent) and a vulcanization accelerator. A film for evaluation was produced in the same manner as in the latex composition I, except that the latex composition IV was used instead of the aforementioned latex composition I.

<Evaluation>

The thicknesses (film thicknesses) of three places at the center portion of the film for evaluation were measured using a test piece thickness meter (trade name "ASKER SDA-12", manufactured by KOBUNSHI KEIKI CO., LTD.) and the minimum thickness was obtained as the thickness of the film for evaluation. Results are presented in Table 1 and Table 2.

The modulus at 500% elongation, the breaking strength, and the breaking elongation of each of the aforementioned films for evaluation were measured according to JIS K 6251. Results are presented in Table 1 and Table 2.

TABLE 1

| | | Unit | Example 1 | 2 | 3 | 4 | 5 | 6 | 7 |
|---|---|---|---|---|---|---|---|---|---|
| Latex No. | | — | A | B | C | D | E | F | G |
| Polymerization | Chloroprene | Parts | 85 | 85 | 95 | 90 | 70 | 70 | 85 |
| | 2,3-Dichloro-1,3-butadiene | by mass | 15 | 15 | 5 | 10 | 30 | 30 | 15 |
| | Dodecylmercaptan | | 0.03 | 0.03 | 0.03 | 0.03 | 0.03 | 0.03 | 0.03 |
| | Pure water | | 90 | 90 | 90 | 90 | 90 | 90 | 90 |
| | Rosin acid A (mass ratio b1/a1 = 0.80) | | 4.8 | 5.3 | 4.8 | 3.3 | 4.8 | 4.5 | 4.3 |
| | Rosin acid B (mass ratio b1/a1 = 2.20) | | — | — | — | — | — | — | — |
| | Rosin acid C (mass ratio b1/a1 = 3.20) | | — | — | — | — | — | — | — |
| | Disproportionated potassium rosinate X (mass ratio b1/a1 = 0) | | — | — | — | — | — | — | 0.5 |
| | Potassium hydroxide | | 1.50 | 1.50 | 1.50 | 1.50 | 1.50 | 1.50 | 1.50 |
| | Sodium salt of β-naphthalene sulfonic acid formalin condensate | | 0.40 | 0.30 | 0.40 | 0.40 | 0.40 | 0.40 | 0.40 |
| | Polymerization temperature | °C. | 20 | 15 | 45 | 30 | 15 | 15 | 20 |
| | Polymerization conversion rate | % | 83 | 65 | 75 | 55 | 62 | 80 | 83 |
| | Mass ratio B1/A1 of entire rosin acid component | | 0.80 | 0.80 | 0.80 | 0.80 | 0.80 | 0.80 | 0.66 |
| Polymer | Mass ratio B2/A2 | — | 0.80 | 0.80 | 0.80 | 0.80 | 0.80 | 0.80 | 0.66 |
| | 2,3-Dichloro-1,3-butadiene copolymerized amount | % by mass | 15.6 | 15.9 | 6.2 | 11.2 | 32.1 | 30.6 | 15.9 |
| | Toluene insoluble content | % by mass | 89 | 70 | 77 | 59 | 85 | 66 | 85 |
| Dip-molded article | Sulfur | — | Absent | Absent | Absent | Absent | Absent | Absent | Absent |
| | Vulcanization accelerator | — | Absent | Absent | Absent | Absent | Absent | Absent | Absent |
| | Thickness | mm | 0.13 | 0.12 | 0.12 | 0.13 | 0.12 | 0.13 | 0.13 |
| | Modulus at 500% elongation | MPa | 1.6 | 2.5 | 1.5 | 1.9 | 1.6 | 1.7 | 1.6 |
| | Breaking strength | MPa | 23.8 | 25.2 | 20.5 | 26.2 | 23.5 | 24.2 | 21.1 |
| | Bronking elongation | % | 1226 | 1386 | 1256 | 1152 | 1324 | 1269 | 1210 |

| | | Unit | Example 8 | 9 | 10 | 11 | 12 | 13 |
|---|---|---|---|---|---|---|---|---|
| Latex No. | | — | H | I | J | K | A | A |
| Polymerization | Chloroprene | Parts | 80 | 70 | 85 | 90 | 85 | 85 |
| | 2,3-Dichloro-1,3-butadiene | by mass | 20 | 30 | 15 | 10 | 15 | 15.6 |
| | Dodecylmercaptan | | 0.03 | 0.03 | 0.03 | 0.03 | 0.03 | 0.03 |
| | Pure water | | 90 | 90 | 90 | 90 | 90 | 90 |
| | Rosin acid A (mass ratio b1/a1 = 0.80) | | 3.6 | 2.5 | — | — | 4.8 | 4.8 |
| | Rosin acid B (mass ratio b1/a1 = 2.20) | | — | — | 4.8 | 3.5 | — | — |
| | Rosin acid C (mass ratio b1/a1 = 3.20) | | — | — | — | — | — | — |
| | Disproportionated potassium rosinate X (mass ratio b1/a1 = 0) | | 1.2 | 2.1 | — | 1.3 | — | — |
| | Potassium hydroxide | | 1.50 | 1.50 | 1.50 | 1.50 | 1.50 | 1.50 |
| | Sodium salt of β-naphthalene sulfonic acid formalin condensate | | 0.40 | 0.30 | 0.40 | 0.40 | 0.40 | 0.40 |
| | Polymerization temperature | °C. | 40 | 20 | 20 | 35 | 20 | 20 |
| | Polymerization conversion rate | % | 68 | 70 | 85 | 70 | 83 | 83 |
| | Mass ratio B1/A1 of entire rosin acid component | | 0.50 | 0.32 | 2.20 | 1.01 | 0.80 | 0.80 |
| Polymer | Mass ratio B2/A2 | — | 0.50 | 0.32 | 2.20 | 1.01 | 0.80 | 0.80 |
| | 2,3-Dichloro-1,3-butadiene copolymerized amount | % by mass | 20.2 | 31.2 | 15.8 | 10.8 | 15.6 | 15.6 |
| | Toluene insoluble content | % by mass | 75 | 77 | 87 | 78 | 89 | 89 |

TABLE 1-continued

| Dip-molded article | Sulfur | — | Absent | Absent | Absent | Absent | Present | Present |
|---|---|---|---|---|---|---|---|---|
| | Vulcanization accelerator | — | Absent | Absent | Absent | Absent | Absent | Present |
| | Thickness | mm | 0.12 | 0.13 | 0.13 | 0.12 | 0.12 | 0.13 |
| | Modulus at 500% elongation | MPa | 1.5 | 1.6 | 1.7 | 1.6 | 1.7 | 1.9 |
| | Breaking strength | MPa | 20.2 | 19.1 | 24.2 | 23.1 | 22.9 | 25.6 |
| | Bronking elongation | % | 1217 | 1421 | 1279 | 1398 | 1226 | 1186 |

TABLE 2

| | | Unit | Comparative Example | | | | Reference Example |
|---|---|---|---|---|---|---|---|
| | | | 1 | 2 | 3 | 4 | 1 |
| Latex No. | | — | L | M | N | O | L |
| Polymerization | Chloroprene | Parts by mass | 90 | 85 | 80 | 70 | 90 |
| | 2,3-Dichloro-1,3-butadiene | | 10 | 15 | 20 | 30 | 10 |
| | Dodecylmercaptan | | 0.03 | 0.03 | 0.03 | 0.03 | 0.03 |
| | Pure water | | 90 | 90 | 90 | 90 | 90 |
| | Rosin acid A (mass ratio b1/a1 = 0.80) | | — | 0.5 | 4.8 | — | — |
| | Rosin acid B (mass ratio b1/a1 = 2.20) | | — | — | — | — | — |
| | Rosin acid C (mass ratio b1/a1 = 3.20) | | — | — | — | 4.8 | — |
| | Disproportionated potassium rosinate X (mass ratio b1/a1 = 0) | | 4.8 | 4.3 | — | — | 4.8 |
| | Potassium hydroxide | | 1.50 | 1.50 | 1.50 | 1.50 | 1.50 |
| | Sodium salt of β-naphthalene sulfonic acid formalin condensate | | 0.40 | 0.40 | 0.40 | 0.30 | 0.40 |
| | Polymerization temperature | °C. | 20 | 10 | 40 | 20 | 20 |
| | Polymerization conversion rate | % | 83 | 75 | 25 | — | 83 |
| | Mass ratio B1/A1 of entire rosin acid component | | 0 | 0.05 | 0.80 | 3.20 | 0 |
| Polymer | Mass ratio B2/A2 | — | 0 | 0.05 | 0.80 | Unavailable polymerization | 0 |
| | 2,3-Dichloro-1,3-butadiene copolymerized amount | % by mass | 10.6 | 16.4 | 21.7 | | 10.6 |
| | Toluene insoluble content | % by mass | 87 | 76 | 40 | | 87 |
| Dip-molded article | Sulfur | — | Absent | Absent | Absent | — | Present |
| | Vulcanization accelerator | — | Absent | Absent | Absent | | Present |
| | Thickness | mm | 0.13 | 0.13 | 0.13 | | 0.13 |
| | Modulus at 500% elongation | MPa | 1.3 | 1.4 | 1.5 | | 1.5 |
| | Breaking strength | MPa | 17.2 | 18.8 | 15.2 | | 24.8 |
| | Breaking elongation | % | 1354 | 1350 | 1242 | | 1221 |

As apparent from Table 1, it is confirmed that, in Examples 1 to 11, even in the case of not using sulfur and a vulcanization accelerator during vulcanization, a dip-molded article having excellent flexibility, breaking strength, and breaking elongation is obtainable. Furthermore, it is confirmed that, also in Examples 12 and 13, a dip-molded article having excellent flexibility, breaking strength, and breaking elongation is obtainable.

As apparent from Table 2, it is confirmed that, in Comparative Examples 1 and 2, since the mass ratio B1/A1 in the entire rosin acid component and the mass ratio B2/A2 in the chloroprene polymer are small, breaking strength is poor. It is confirmed that, in Comparative Example 3, since the toluene insoluble content of the chloroprene polymer is small, breaking strength is poor. It is confirmed that, in Comparative Example 4, since the mass ratio B1/A1 in the entire rosin acid component is large, a chloroprene polymer is not obtainable, and thus a chloroprene polymer composition containing a chloroprene polymer is not obtainable.

It is confirmed that, in Reference Example 1, a dip-molded article having excellent flexibility, breaking strength, and breaking elongation is obtainable by using sulfur and a vulcanization accelerator during vulcanization, but in Comparative Example 1 in which a dip-molded article is obtained in the same manner as in Reference Example 1 except that sulfur and a vulcanization accelerator are not used during vulcanization, breaking strength is poor.

The invention claimed is:

1. A method for manufacturing a chloroprene polymer composition, the method comprising:
   a polymerization step of polymerizing chloroprene in the presence of at least one rosin acid component selected from the group consisting of a rosin acid and a rosin acid salt to obtain a chloroprene polymer composition containing a chloroprene polymer, wherein
   in the rosin acid component, a mass ratio B1/A1 of a total amount B1 of abietic acid, neoabietic acid, palustric acid, levopimaric acid, and salts thereof with respect to a total amount A1 of dehydroabietic acid, pimaric acid, isopimaric acid, dihydroabietic acid, and salts thereof is 0.10 to 1.50, and
   a toluene insoluble content of the chloroprene polymer is 50% by mass or more.

2. The method for manufacturing a chloroprene polymer composition according to claim 1, wherein chloroprene and 2,3-dichloro-1,3-butadiene are polymerized in the polymerization step.

3. The method for manufacturing a chloroprene polymer composition according to claim 2, wherein a used amount of the 2,3-dichloro-1,3-butadiene is more than 0% by mass and 20% by mass or less on the basis of a total amount of monomers used in polymerization of the chloroprene polymer.

4. The method for manufacturing a chloroprene polymer composition according to claim 1, wherein a used amount of the rosin acid component is 3.0 to 5.0 parts by mass with respect to 100 parts by mass of monomers used in polymerization of the chloroprene polymer.

5. A chloroprene polymer composition comprising a chloroprene polymer, wherein in the chloroprene polymer, a mass ratio B2/A2 of a total amount B2 of abietic acid, neoabietic acid, palustric acid, levopimaric acid, and salts thereof with respect to a total amount A2 of dehydroabietic acid, pimaric acid, isopimaric acid, dihydroabietic acid, and salts thereof is 0.10 to 1.50, and a toluene insoluble content of the chloroprene polymer is 50% by mass or more.

6. The chloroprene polymer composition according to claim 5, wherein the chloroprene polymer has a monomer unit of chloroprene and a monomer unit of 2,3-dichloro-1, 3-butadiene.

7. The chloroprene polymer composition according to claim 6, wherein a content of the monomer unit of 2,3-dichloro-1,3-butadiene is more than 0% by mass and 20% by mass or less on the basis of a total amount of monomer units constituting the chloroprene polymer.

8. A dip-molded article of the chloroprene polymer composition according to claim 5.

9. The dip-molded article according to claim 8, wherein the dip-molded article is gloves, balloons, catheters, or boots.

10. The dip-molded article according to claim 8, wherein the dip-molded article does not comprise sulfur and a vulcanization accelerator.

11. The method for manufacturing a chloroprene polymer composition according to claim 1, wherein a used amount of the chloroprene is 90% by mass or less on the basis of a total amount of monomers used in polymerization of the chloroprene polymer.

12. The method for manufacturing a chloroprene polymer composition according to claim 2, wherein a used amount of the 2,3-dichloro-1,3-butadiene is 10 to 20% by mass on the basis of a total amount of monomers used in polymerization of the chloroprene polymer.

13. The method for manufacturing a chloroprene polymer composition according to claim 1, wherein the toluene insoluble content of the chloroprene polymer is more than 85% by mass.

14. The method for manufacturing a chloroprene polymer composition according to claim 1, wherein a polymerization temperature is lower than 25° C. in polymerization of the chloroprene polymer.

15. The method for manufacturing a chloroprene polymer composition according to claim 1, wherein a polymerization conversion rate is less than 85% in polymerization of the chloroprene polymer.

16. The chloroprene polymer composition according to claim 5, wherein a content of a monomer unit of chloroprene is 90% by mass or less on the basis of a total amount of monomer units constituting the chloroprene polymer.

17. The chloroprene polymer composition according to claim 6, wherein a content of the monomer unit of 2,3-dichloro-1,3-butadiene is 10 to 20% by mass on the basis of a total amount of monomer units constituting the chloroprene polymer.

18. The chloroprene polymer composition according to claim 5, wherein the toluene insoluble content of the chloroprene polymer is more than 85% by mass.

* * * * *